United States Patent Office.

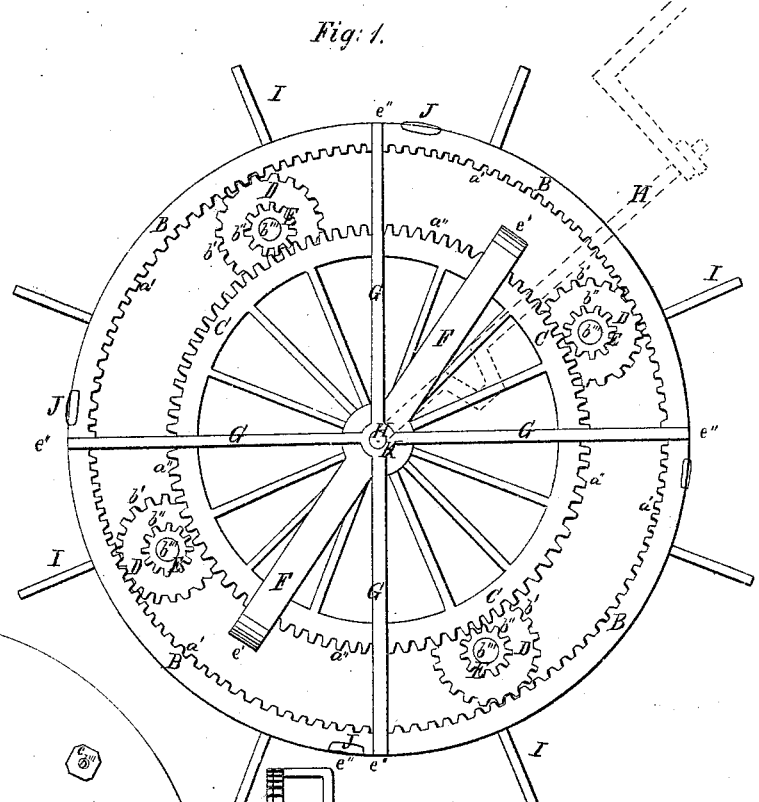
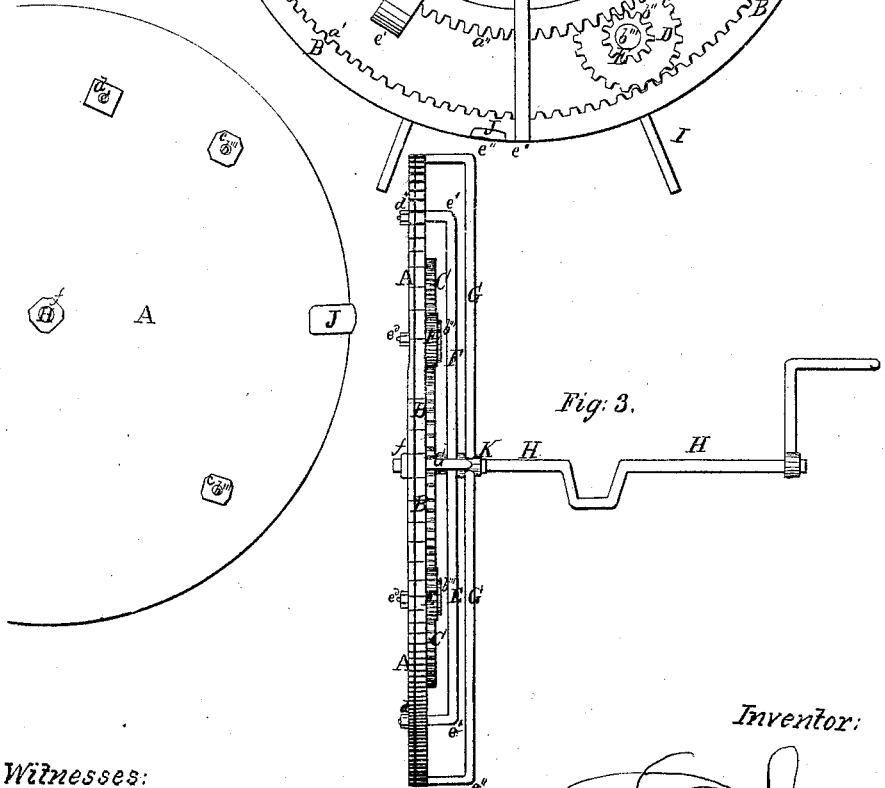

ROWLAND CROMELIEN, OF WASHINGTON, DISTRICT OF COLUMBIA.

Letters Patent No. 73,783, dated January 28, 1868.

IMPROVEMENT IN PADDLE-WHEELS.

The Schedule referred to in these Letters Patent and making part of the same.

TO ALL WHOM IT MAY CONCERN:

Be it known that I, ROWLAND CROMELIEN, of the city of Washington, county of the same, District of Columbia, have invented a new and improved Mode in the Construction in Wheels for Steam-Vessels, by which strength and speed are attained; and I do hereby declare that the following is a full and exact description thereof, reference being had to the accompanying drawing, and to the letters of reference marked thereon.

A is the outside frame or iron plate, for carrying therein all the gearing-works, upon which such works run and are secured. B is the outside large cog-rim circle of the wheel, with its inner cog-teeth $a'$. C is the inside large cog-rim circle wheel, with its outside cog-teeth $a''$, and which has in its centre the main shaft H. D is one of the four small cog-wheels, working in the cog-teeth of $a'$, with its outside cog-teeth $b'$, and partly lying under cog-wheel C; E being the smallest cog-wheel, working in $a''$, with its outside cog-teeth $b''$. This small cog-wheel lies on the centre of cog-wheel $d$, and a bolt passes through the same, as also through D and $a$, secured by a nut to the outside of plate A to a nut, $c$. F is an iron plate-brace, lying above the foundation-frame plate and cog-wheel C, through both of which the main axle or shaft H passes, and which lies on top of cog-wheel C, its ends making an elbow, $e'$, which arms are let in the frame or plate A, and secured on the outside by nut $d$. G are the four independent shafts or arms, secured to the main shaft, and let in by an elbow, $e''$, on the outer circle cog-rim, which, by its connections, strengthens the whole wheel and shaft together, and prevents the same from any vibration. The four inner ends of the independent arms are let in and secured to the main shaft above the brace or plate F. H is the main axle or shaft, by which the machine or wheel derives its equalized distributed power from the combination and construction of the cog-wheels and rims. The axle passes through the centre of G, F, C, and A, and is secured to the outside frame or plate A, by a nut, $f$. I is to represent paddles, if for steamers' use. J are clasps, which secure and hold together frame or plate A and cog-wheel B. K is the collar or centre of shaft or axle H.

The foregoing explains the nature of my improvement, to enable others skilled in the art to make and use my invention; and that which I desire to secure by Letters Patent is the general construction, formation, and combination, in the application of two teethed cog-rim circles, each diminishing in size, and you may have for use more of such circles, if such be of benefit to it, with the eight inner smaller wheels, as is shown as B and C by the drawing, as also the figures to explain, Nos. 2 and 3. Such forms the complete main wheel, for which two sets are required, and they front or face each other, as is described. Thus four of such separate sections of cog-rim circles, as particularized, make a set of wheels for a steamer, connected, as is shown, with the four additional shafts or arms, secured to the main shaft, and let in on the top of the outside circled cog-rim. Such gives the whole wheel great strength and power, and they work all at one time for its revolving purpose with increased speed of revolutions. For water-power on oceans and rivers or lake travelling use to great advantage. The same principle applies to locomotives without the paddles.

The accompanying drawings exhibit how the small cog-wheels are securely placed and fastened, the largest of which cog-wheels works and runs to the outer rim inner circled cog-teeth, and lying about one-third under the second inner cogged-rim circle, in which the smallest cogged-teeth wheel runs, and which lies on the top of the first small cog-wheel. It is propelled by the means of the working of the main shaft, and to and on the main shaft are placed and secured the elbow-arms or shafts, secured to the outside circle, which independent arms or shafts derive their power from the main shaft, and which carries and strengthens the whole wheel for any use, as is fully described, or for any other wheel substantially the same, which will produce the same intended benefit and effect, and by which improved combination I gain in speed at least one-fifth over the present system, as the paddle-wheel makes five revolutions while the main shaft or axle only makes four. By this system or principle, by the means of the four connected shafts or arms deriving their power from the main shaft, and the mode of the different wheels, such equalizes and distributes the whole force of the power of the main shaft, derived from the steam-engine, over the whole surface of the diameter of the wheel alike, and thus it greatly relieves the strain of the work and labor of the main shaft, which, as now used, often breaks or bends, and greatly retards a voyage, and for water-use requires no oiling, as the water is the lubricator. An iron cover can be laid over the gearing-works, with holes therein to let the water dash in. Furthermore, two of each of the small cog-wheels may do as well as four of each, and an inclined or straight iron arm or shaft may do as well as the elbow-shaped arm. Furthermore, for many other mechanical uses, the same formation of wheel can be used.

What I claim as my invention, and desire to secure by Letters Patent, is—

The combination of paddles or buckets with annular-toothed wheels, operated substantially as described for the purpose specified.

R. CROMELIEN.

Witnesses:
    E. JORDAN,
    FR. BERGMAN.